United States Patent [19]
Olde

[11] Patent Number: 5,924,678
[45] Date of Patent: Jul. 20, 1999

[54] BITE-VALVE

[76] Inventor: Jarl Olde, Laduvägen 4, S-756 47 Uppsala, Sweden

[21] Appl. No.: 08/860,565
[22] PCT Filed: Jun. 3, 1996
[86] PCT No.: PCT/SE96/00731
  § 371 Date: Jun. 30, 1997
  § 102(e) Date: Jun. 30, 1997
[87] PCT Pub. No.: WO96/38037
  PCT Pub. Date: Dec. 5, 1996

[30] Foreign Application Priority Data

Jun. 2, 1995 [SE] Sweden .................................. 9404333

[51] Int. Cl.[6] .................................. A01K 7/02; F16K 1/06
[52] U.S. Cl. .............................. 251/348; 251/354; 119/75
[58] Field of Search ..................... 251/347, 348, 251/354; 119/72.5, 75

[56] References Cited

U.S. PATENT DOCUMENTS 3,669,077 6/1972 Spierenburg ........................... 119/72.5
3,838,664 10/1974 Atchley .................................. 119/72.5
4,573,433 3/1986 Thompson ................................. 119/75

FOREIGN PATENT DOCUMENTS 3025615 1/1982 Germany .
401596 5/1978 Sweden .

Primary Examiner—A. Michael Chambers
Attorney, Agent, or Firm—Young & Thompson

[57] ABSTRACT

The present invention relates to a bite-valve (1) for the watering of animals including a mounting part (3) and an outlet part (4). The valve-mechanism for the opening and closing of the fluid flow through the bite-valve (1) is housed in the mounting part (3), while the actuating mechanism, actuatable by an animal, for the opening of the fluid flow through the bite-valve (1) is housed in the outlet part. The actuator mechanism includes an actuating member (12) in the shape of a ball, part of which is arranged to project through a hole in the wall of the outlet part (4).

20 Claims, 2 Drawing Sheets

BITE-VALVE

The present invention relates to a drinking device for the watering of animals, and more specifically to a drinking device of the so-called bite-valve type, where the animal puts its mouth over the drinking device, shaped as valve housing, thereby, with some part of its mouth, e.g. the palate, influencing a actuating device by pressing it, said actuating device then opening the water-flow through the valve body and into the mouth of the animal.

An earlier embodiment of such a bite-valve is described in the Swedish laid-open publication No. 7414797-6. It comprises a tube-shaped valve housing, the one end of which valve body being designed to be mounted on a water pipe, directly or indirectly via a connecting piece, and the other end of said bite-valve being suitably shaped for an animal to put its mouth over it. A valve stem stretches axially through the valve body from a valve disc towards the outlet end of the valve body. An actuator, sticking out a bit through a hole in the side of the valve housing, is thus placed so as to be radially movable into the housing, being guided by a tap, which is fixed in the housing, extending into a guiding hole in said actuator. The actuator is coupled to the valve stem, whereby said valve stem, at the pressing of the actuator, is tilted, thereby also tilting the valve disc which opens for the water flow.

This known type of bite-valve for the watering of animals has some advantages, especially in leaving very little or no spillage, and in being easily actuable for the animal when it wants to drink, and, furthermore, in that it cannot be unintentionally actuated by an animal playing with, or scratching itself against the valve. It has, however, also some disadvantages. Thus it comprises many parts, making it, as it were, expensive to manufacture and assemble, and the demands on the precision of the valve in order to insure its safe functioning are very high. The smallest error in tolerance between the tap, the actuator and the hole in the wall of the housing can lead to the jamming of the actuator, whereby the valve will fail to close. There are other places, as well, in and on the valve where dirt and other deposits may cause malfunction with the valve, e.g. in the tap guiding hole in the actuator, and in the actuator coupling of the valve stem. In addition herewith, it is possible for the animal to reach the actuator and bite it, thereby causing damage, in the form of scratches or other types of damage, to said actuator, whereby the jamming of said actuator through the hole in the wall of said valve housing.

The object of the present invention is to solve the above-stated problems. This object is reached through a bite-valve for the watering of animals, according to the appended patent claims, in which claims is also stated that, which in particular characterizes the present invention.

The invention is described in detail in the following by means of reference to the appended drawings, wherein.

Figure 1:
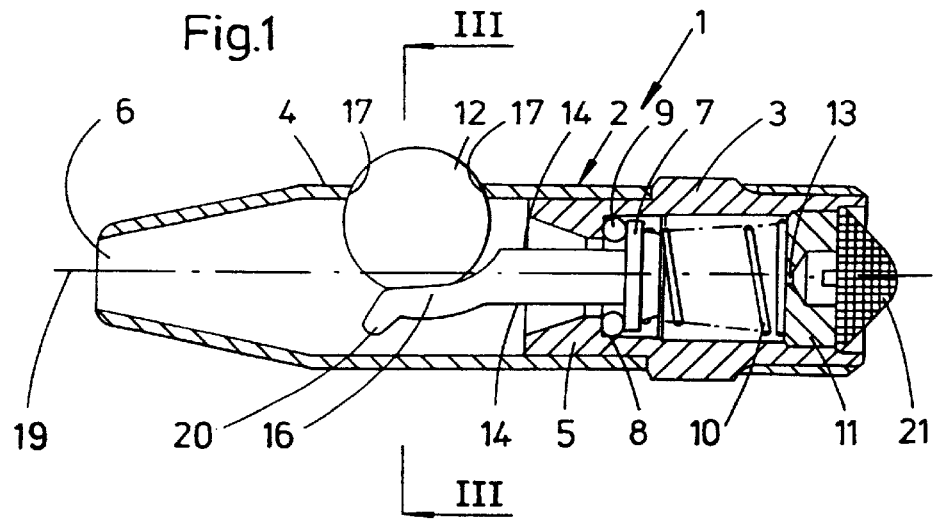
FIG. 1 shows a schematic longitudinal cross-section of a bite-valve according to the present invention.
Figure 2:
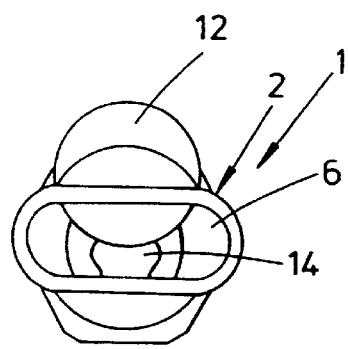
FIG. 2 shows a front view of the bite-valve shown in FIG. 1
Figure 3:
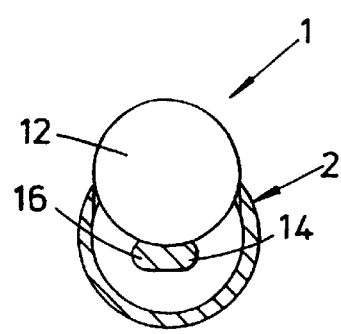
FIG. 3 shows a partial cross-section along the line III—III in FIG. 1.
Figure 4:
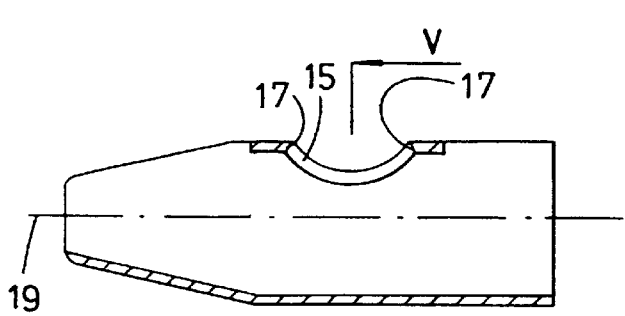
FIG. 4 shows a schematic, partial cross-section through the outlet section of a bite-valve according to the present invention.
Figure 5:
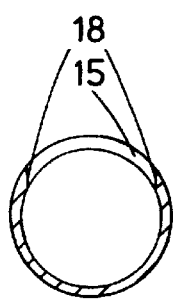
FIG. 5 shows a cross-section along the line V—V in FIG. 4.

The embodiments of the water dispensing device or bite-valve 1 according to the present invention as illustrated by the drawings are basically of the same structure as the one disclosed by the Swedish laid-open publication No. 7414797-6, and involves, in practice, a valve housing 2, consisting of two assembled parts, one mounting part 3 and one outlet part 4. The valve-mechanism is contained in said mounting part 3, and the actuator is contained in said outlet part 4. The outlet part 4 is manufactured from a piece of a pipe, the one end of which is tightly wedged onto a shoulder 5 of the mounting part 3. The other end of said outlet part has been slightly pressed, thereby rendering it, as is shown in the side-views in the drawings, a wedge-shape, thereby giving said bite-valve a suitable shape for the drinking animal to put into its mouth. The outlet 6 is hereby given a flat, broad shape.

The valve mechanism has a basic conventional construction, and comprises a valve disc 7, which valve disc seals in the flow direction against a valve seat 8, which in the disclosed embodiment consists of an o-ring, said o-ring resting against a shoulder 9 in said mounting part 3. Said valve disc 7, then opening counter to the flow, is sealingly pressed against said valve seat 8, in part by means of the pressure from the water which when the valve is open flows through the bite-valve 1, and in part by means of a spring 10, said spring being constricted between said valve disc 7 and a stopping member 11 at the inlet end of said bite-valve 1. Adjacent to the stopping member 11 is also mounted a sieve 12 and a constriction 13, which constriction limits the flow of water through said bite-valve 1.

From said valve disc 7 a valve stem 14 stretches through a central hole through said shoulder 5, onto which shoulder 5 the outlet part 4 is wedged. A ball shaped actuating member 12 rests against the stem 14 and is in part extending through a hole 15 made in the wall of the outlet part 4. Said valve-stem 14 is at that part 16 which supports the ball 12 of a spoon-like embodiment, and said ball 12 rests in the cup of said spoon 16. The pressure from the water as well as from the spring 10 between the valve disc 7 and the stopping member 11 applies a force to the valve stem 14 sufficient to enable said valve stem 14 to hold the ball 12 pressed outwards in the hole 15, while at the same time keeping the valve shut.

The hole 15 for the ball 12 in the embodiment disclosed by FIGS. 1–5 is machined with a such a tool, that a curved under-cutting 17 of the wall of the hole 15 is created in those regions which have the highest location, or, which regions are located in front of or behind said hole 15 when seen in the longitudinal direction of said bite-valve 1. Said under-cutting 17, having mainly the same radius of curvature as the ball 12, changes into cylindrical regions 18 of the walls of the hole 15, constituting the side of the outlet part 4.

The outlet part 4 has in one embodiment an inner diameter of 17 mm, and the ball 12 has an outer diameter of 16 mm. Thereby, the hole 15 has a diameter which at the under-cuttings 17 is smaller, but elsewhere bigger, than that of said ball 12, 16 mm. When machining, grooves, constituting a continuation of said cylindrical regions 18 have been made in the opposite inner walls of the outlet part 4, said grooves 18 extending a few mm's from the edge of the hole 15 and inwards thereby creating for the ball 12 a guided track for its moving from a position in which it is partly extended through the hole 15, to a position where it is slightly pressed inwards, while at the same time stopping the ball 12 from moving in the axial direction in the outlet part 4.

In order to fully open the flow of water through the bite-valve 1 in this embodiment, it will take an inwardly directed movement of the ball 12 of approximately 2.5 mm, corresponding to a tilting angle of the valve disc 7 of approximately 5 degrees.

The spoon-like part 16 of the valve stem 14 receives the ball 12 in a guiding manner, such that the mechanism is rendered self-adjusting to the optimum position for the opening. This is achieved partly by the part of the valve stem 14 closest to the valve disc 7 extended with its centre axis coincident with the centre axis 19 of the bite-valve 1 itself, while the spoon formed part 16 against which the ball is resting is below this centre axis 19, and partly by the relatively great width of the spoon formed part 16.

At its free end the valve stem 14 is provided with a down-bend 20, which restricts the opening of the valve in such a manner, that said down-bend 20 hits the bottom wall of the outlet part 4 when the valve disc is being maximally tilted. Thereby the ball 12 is prevented from moving that far into the outlet part 4 that it will leave the guiding provided by the opposite cylindrical grooves 18 thereby being able to move freely in the axial direction in the outlet part 4.

Using a ball 12 as an actuating member means that when an puts the bite-valve into its mouth by opening the mouth over the outlet end 6 of the bite-valve thereby pressing the ball 12 inwards in the outlet part 4, the animal is not able to get hold of the ball 12, which instead is pressed inwards and subsequently rolls away. At the same time the water-flow is being opened through the bite-valve 1 and into the mouth of the animal. The water runs through the opened valve with such flow that all of the water can run through the outlet 6. Under normal circumstances, no leakage through the gap formed between the ball 12 and the wall of the hole 15 will occur, unless the animal tries to cover the outlet with its tongue or in any other way. Such undesired flow is, however, advantageous in that it will be flushing off possible dirt around the ball 12.

Figure 6:
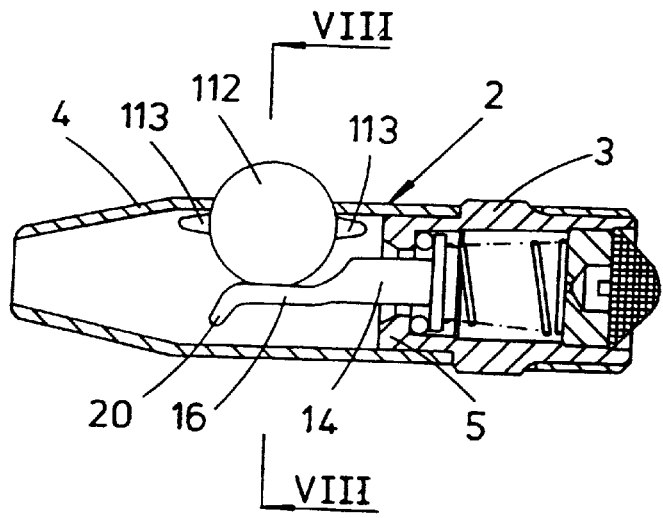
FIG. 6 shows a schematic longitudinal cross-section similar to FIG. 1 through a further embodiment of said bite-valve according to the present invention.
Figure 7:
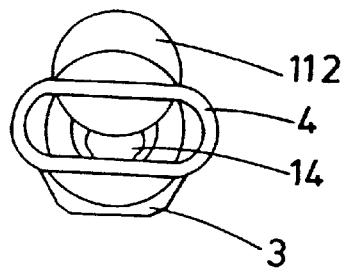
FIG. 7 shows a front view of the bite-valve shown in FIG. 6.
Figure 8:
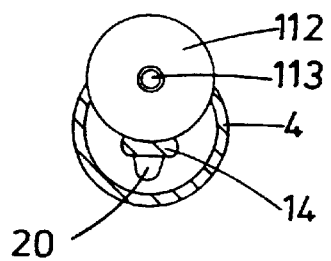
FIG. 8 shows a partial cross-section along the line VII—VII in FIG. 6.

In FIGS. 6–8 a further embodiment of a bite-valve according to the present invention is disclosed. As far as it corresponds to the first embodiment, which, as it were, it substantially does, the same reference figures have been used throughout, in the appended drawings. Since both bite-valves have one and the same function, this is not in detailed described with this further embodiment.

The second embodiment differs from the first embodiment in that the ball 112 has been provided with two diametrically opposite pegs or taps 113, projecting a distance from the ball 112. In the disclosed embodiment said taps 113 are slightly conical from the ball 112 and outwards. Furthermore, said taps 113 are placed so as to be projecting diametrically on a line stretching through the centre of the ball, but they need not necessarily be so arranged, but can instead be offset from such a line, whereby they no longer will be projecting radially.

To hold the ball 12 in place in the first embodiment of the invention, so as to prevent it from popping out of the outlet part 4, it is necessary to design the hole 15 through the outlet part 4 in a special way. Additionally, there is a guiding of the ball 12 in the walls of the outlet part 4, as hereinbefore described. The shape of the hole 15 and the guidings demands for special action in the machining process, while practically any round ball, with the correct size made in a non-corrosive material, can be used. In the second embodiment, an ordinary circular hole can be made in the wall of the outlet part 4, wherein the diameter of the hole is somewhat bigger than that of the ball 112. It is, then, possible to make the hole by means of conventional drilling. The taps 113 then prevent the ball 112 from popping out of the hole.

The assembly of the bite-valve in this second embodiment can be thus prepared, that in the first step, the mounting part 3 of the valve mechanism is mounted onto the outlet part 4 by means of press fitting. In the first embodiment, the ball 12 has to be inserted in the outlet part 4 before said outlet part can be assembled with the mounting part 3, which means that the risk is run that the ball 12 is missing when the parts 3,4 are being assembled without the assembly worker noticing this. In the second embodiment the ball 112 is placed in position through the hole 15 in the outlet part 4 by being tilted back and forth until its fits in position. When, then, the valve stem 14 is with its spoon-like part 16 is inserted under the ball 112, the distance from said ball 112 to the inner wall of the outlet part 4 will be so small that the ball 112 cannot be tilted out again. The force applied on the ball 112 from the spring-loaded valve stem 14 presses said ball 112 outwards through the hole 15 to a position where the taps 113 are located on the inside of the outlet part 4 oriented in the longitudinal direction of said outlet part 4. Due to the conical form of the taps 113 the ball 112 tends to place itself centrally in the hole 15, even though this placement is not in any way critical. That the ball 112 can move in all directions in the hole 15 is from a functional viewpoint advantageous, because it allows possible dirt located between the ball 112 and the edge of the hole 15 to come off by itself.

When the valve is shut, the valve stem 14 extends to a certain position, which position is such that the ball 12, 112 is not necessarily being pushed to one position against the edge of the hole 15, or the taps 113 against the inside of the outlet part 4, but instead allowing for a small play for the ball 12, 112.

The use of a ball 12, 112 resting against the spoon-like part 16 of the valve stem 14, means that the precision in the finish of the parts does not have to be too high, and there are really no places where dirt and other deposits can accumulate, thereby influencing the function of the bite-valve 1. Furthermore, a ball 12, 112 being used as an actuating member has the advantage of being impossible to get a grip on for a drinking animal, as stated above.

The assembly of the bite-valve according to the first embodiment of the present invention is thus performed, that the ball 12 is placed in the outlet part 4, and is kept in place simply by turning the hole 15 downwards whereby the ball is guided by the cylindrical regions 18. Subsequently, the outlet part 4 is pressed over the shoulder 5 on the mounting part 3, being pre-assembled with its valve. The valve disc 7 with its stem 14 being turnable, the valve stem 14 with its spoon-like part 16 will automatically come in position under the ball 12 and hold it in place.

The assembly of the bite-valve according to the second embodiment is thus performed, as hereinbefore mentioned, that the ball 112 is tilted in through the hole 15 before the valve-stem 14 is put in place. After said valve stem 14 has come in place, the ball 112 cannot be tilted back out of the hole 15, since the ball 112 cannot be pressed that far back, that the taps 113 can be moved out of the hole 15 without these locking the ball 112 inside the outlet part 14.

Through the present invention, the initially set-forth object to provide a simple and reliable bite-valve intended for use in the watering of animals, has been achieved. Even though the invention is primarily intended to give water to animals, it can be realised that it is, as well, suitable for use with other liquids, such as medicines or the like.

I claim:

1. A bite-valve (1) consisting of a mounting part (3) and an outlet part (4), which parts are assembled to form one unit, wherein a valve mechanism for the opening and closing of the fluid flow through said bite-valve (1) is housed in said mounting part (3), and an actuating mechanism, being movable by an animal for the opening of the fluid flow, is housed in said outlet part (4), characterized in that the actuator mechanism comprises a ball (12, 112), said ball (12, 112) being arranged so as to partly project through a hole (15) in the wall of the outlet part (4), a part of a valve stem (14) from said valve mechanism supporting said ball (12, 112) and pressing it outwards in said hole (15).

2. The bite-valve (1) according to claim 1, characterized by said hole (15) in the wall of said outlet part (4) having a largest cross-sectional area smaller than the largest cross-sectional area of said ball (12), and being made with a curved under-cutting (17) in those regions of said wall which are situated in front of, and behind said hole (15) when seen in the longitudinal direction of said bite-valve (1), the radius of said under-cutting (17) being mainly the same as the radius of said ball (12).

3. The bite-valve according to claim 2, characterized by those wall-regions (18) of said hole (15) situated at the side thereof being cylindrical and extending inwards from said hole (15) thus forming a guide path for said ball (12).

4. The bite-valve according to claim 3, characterized by the radius of said ball (12) being equal to, or smaller than the radius of said wall (17) of said hole (15), and the diameter of said hole (15) being smaller than the diameter of said ball (12).

5. The bite-valve according to claim 3, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

6. The bite-valve according to claim 2, characterized by the radius of said ball (12) being equal to, or smaller than the radius of said wall (17) of said hole (15), and the diameter of said hole (15) being smaller than the diameter of said ball (12).

7. The bite-valve according to claim 6, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

8. The bite-valve according to claim 2, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

9. The bite-valve according to claim 1, characterized by those wall-regions (18) of said hole (15) situated at the side thereof being cylindrical and extending inwards from said hole (15) thus forming a guide path for said ball (12).

10. The bite-valve according to claim 9, characterized by the radius of said ball (12) being equal to, or smaller than the radius of said wall (17) of said hole (15), and the diameter of said hole (15) being smaller than the diameter of said ball (12).

11. The bite-valve according to claim 10, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

12. The bite-valve according to claim 9, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

13. The bite-valve according to claim 1, characterized by the radius of said ball (12) being equal to, or smaller than the radius of said wall (17) of said hole (15), and the diameter of said hole (15) being smaller than the diameter of said ball (12).

14. The bite-valve according to claim 13, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

15. The bite-valve according to claim 1, characterized in that two opposite taps (113) are projecting from said ball (112).

16. Bite-valve according to claim 15, characterized by said taps (113) being conically tapered beginning at the ball.

17. The bite-valve according to claim 16, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

18. The bite-valve according to claim 15, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

19. The bite-valve according to claim 1, characterized in that a valve stem (14) projecting axially from a valve disc (7) to a position under the actuating member (12), said valve stem is spoon-shaped under the ball (12, 112), said ball (12, 112) resting against said valve stem (14) in its spoon-shaped part (16).

20. The bite-valve according to claim 19, characterized in that the part of said valve-stem (14) which is closest to said valve-disc (7), has its symmetry axis coincident with the centre axis (19) of the bite-valve (1), and that the spoon-like part (16) is located below this centre axis (19).

* * * * *